H. K. & T. F. STOHLER.
Eaves Trough Hanger
No. 166,905.
Patented Aug. 17, 1875
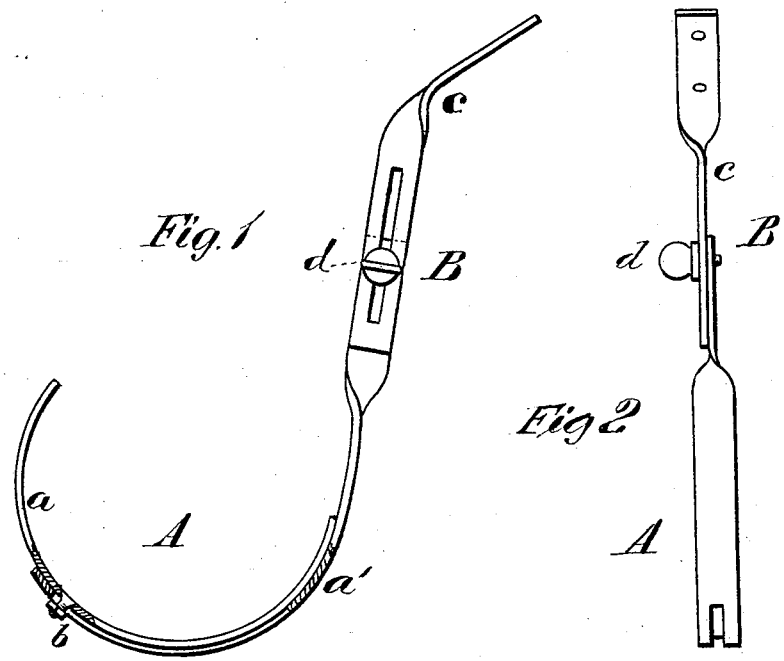
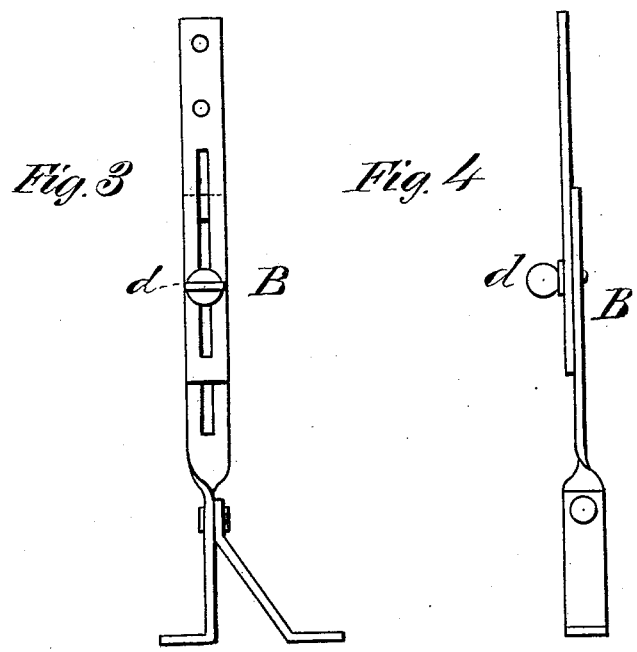
WITNESSES
INVENTORS
Henry K. Stohler
Thomas F. Stohler
ATTORNEYS

UNITED STATES PATENT OFFICE.

HENRY K. STOHLER AND THOMAS F. STOHLER, OF MOUNT JOY, PA.

IMPROVEMENT IN EAVES-TROUGH HANGERS.

Specification forming part of Letters Patent No. 166,905, dated August 17, 1875; application filed July 17, 1875.

*To all whom it may concern:*

Be it known that we, HENRY K. STOHLER and THOMAS F. STOHLER, both of Mount Joy, in the county of Lancaster and State of Pennsylvania, have invented a new and valuable Improvement in Adjustable Spout-Hooks; and we do hereby declare that the following is a full, clear, and exact description of the construction and operation of the same, reference being had to the annexed drawings making a part of this specification, and to the letters and figures of reference marked thereon.

Figure 1 of the drawings is a representation of a section of our spout-hook, and Figs. 2, 3, and 4 are plan views of the same.

This invention has relation to supporting hooks or brackets for eaves-troughs; and the nature of our invention consists in an extensible hook, combined with an extensible shank, whereby the trough can be readily adjusted vertically, or given any desired tilt required, as will be hereinafter explained.

In the annexed drawings, Figs. 1 and 2, A designates the hook, which receives and embraces the eaves-trough, and B is the shank of this hook. The hook A is made of two pieces, *a a'*, and the piece *a* is secured to the piece *a'* by means of a screw, which passes through a long slot made in the latter, and receives a nut, *b*. By loosening the nut *b* the piece *a* can be adjusted, as may be desired. The shank B is also made of two pieces—that is to say, a straight portion, which is a part of the hook, and a slotted angular portion, *c*. These two pieces are secured together by a clamp-screw, *d*, by loosening which the shank can be extended or shortened. The upper angular portion of the shank B is perforated for receiving screws or nails, which secure the device to the top of a rafter.

Fig. 3 shows a shank which is adapted for being secured to the cornice of a building, and Fig. 4 shows a shank which is adapted for being secured to the side of a rafter.

What we claim as new, and desire to secure by Letters Patent, is—

1. An eaves-trough bracket or supporting-hook, A, composed of adjustable portions *a a'* secured together, substantially as described.

2. In combination with the hook A the shank B, made adjustable, substantially as described.

In testimony that we claim the above we have hereunto subscribed our names in the presence of two witnessess.

HENRY K. STOHLER.
    THOMAS F. STOHLER.

Witnesses:
    JNO. H. ZELLER,
    CHAS. H. ZELLER.